(12) United States Patent
Nishimura et al.

(10) Patent No.: US 12,472,933 B2
(45) Date of Patent: Nov. 18, 2025

(54) VEHICLE DRIVE DEVICE

(71) Applicant: AISIN CORPORATION, Aichi (JP)

(72) Inventors: Mitsuhiro Nishimura, Kariya (JP);
Yasuhiro Fujiwara, Kariya (JP);
Takahiro Fujiwara, Kariya (JP)

(73) Assignee: AISIN CORPORATION, Aichi (JP)

( * ) Notice: Subject to any disclaimer, the term of this patent is extended or adjusted under 35 U.S.C. 154(b) by 167 days.

(21) Appl. No.: 18/265,844

(22) PCT Filed: Feb. 16, 2022

(86) PCT No.: PCT/JP2022/006119
§ 371 (c)(1),
(2) Date: Jun. 7, 2023

(87) PCT Pub. No.: WO2022/181409
PCT Pub. Date: Sep. 1, 2022

(65) Prior Publication Data
US 2024/0059273 A1 Feb. 22, 2024

(30) Foreign Application Priority Data
Feb. 25, 2021 (JP) .................................. 2021-028155

(51) Int. Cl.
*B60W 20/30* (2016.01)
*B60W 10/02* (2006.01)
(Continued)

(52) U.S. Cl.
CPC ............ *B60W 20/30* (2013.01); *B60W 10/02* (2013.01); *B60W 20/15* (2016.01); *B60W 20/40* (2013.01);
(Continued)

(58) Field of Classification Search
CPC ...... B60W 20/30; B60W 10/02; B60W 20/15; B60W 20/40; B60W 2510/0241; B60W 2540/10; B60W 2710/027
(Continued)

(56) References Cited

U.S. PATENT DOCUMENTS

| 8,798,839 B2* | 8/2014 | Yamanaka | B60L 50/16 |
| | | | 701/99 |
| 2015/0166055 A1* | 6/2015 | Matsui | B60W 30/184 |
| | | | 180/65.265 |
| 2020/0198616 A1 | 6/2020 | Kumazaki et al. | |

FOREIGN PATENT DOCUMENTS

| JP | 2013-169925 A | 9/2013 |
| JP | 2020-101219 A | 7/2020 |
| WO | 2014/034319 A1 | 3/2014 |

OTHER PUBLICATIONS

International Search Report for PCT/JP2022/006119 filed Mar. 29, 2022 [PCT/ISA/210].

* cited by examiner

*Primary Examiner* — Isaac G Smith
(74) *Attorney, Agent, or Firm* — Sughrue Mion, PLLC

(57) ABSTRACT

A control device is configured to perform torque response slip control for bringing an engagement device into a slip engaged state so that transfer torque of the engagement device has a magnitude corresponding to required torque, shift control for shifting the shift speed of an automatic transmission, and transfer torque limit control for limiting the transfer torque of the engagement device to a value equal to or less than a limit value smaller than the required torque, the required torque being torque that is required to be transferred from the rotating electrical machine side to the automatic transmission via the engagement device that connects and disconnects power transmission between the rotat- (Continued)

ing electrical machine and the automatic transmission. The control device performs the transfer torque limit control instead of the torque response slip control in a case where the torque response slip control is being performed when performing the shift control.

6 Claims, 6 Drawing Sheets

(51) Int. Cl.
*B60W 20/15* (2016.01)
*B60W 20/40* (2016.01)
(52) U.S. Cl.
CPC . *B60W 2510/0241* (2013.01); *B60W 2540/10* (2013.01); *B60W 2710/027* (2013.01)
(58) Field of Classification Search
USPC .......................................................... 701/22
See application file for complete search history.

VEHICLE DRIVE DEVICE

CROSS REFERENCE TO RELATED APPLICATIONS

This application is a National Stage of International Application No. PCT/JP2022/006119 filed Feb. 16, 2022, claiming priority based on Japanese Patent Application No. 2021-028155 filed Feb. 25, 2021, the entire contents of which are incorporated in their entirety.

TECHNICAL FIELD

The present disclosure relates to vehicle drive devices including: an input member drivingly connected to an internal combustion engine included in a vehicle; an output member drivingly connected to a wheel of the vehicle; a rotating electrical machine that functions as a driving force source for the wheel; an automatic transmission that changes the speed of rotation transmitted from the rotating electrical machine side and transmits the resultant rotation to the output member side; an engagement device that connects and disconnects power transmission between the rotating electrical machine and the automatic transmission; and a control device that control these.

BACKGROUND ART

Patent Document 1 below discloses a vehicle drive device (12) including: an input member (34) drivingly connected to an internal combustion engine (14); an output member (22) drivingly connected to wheels (28); a first rotating electrical machine (MG1); a second rotating electrical machine (MG2); an automatic transmission (20) that changes the speed of rotation transmitted from the side of these rotating electrical machines and transmits the resultant rotation to the output member (22) side; a distribution differential gear mechanism (32) that distributes a driving force of the internal combustion engine (14) transmitted to the input member (34) to the first rotating electrical machine (MG1) and the automatic transmission (20). The signs shown in parentheses in the description of the background art are those of Patent Document 1.

In the vehicle drive device (12) described above, torque down control for reducing torque transferred to the automatic transmission (20) is performed when required torque, namely torque required to be transferred from the side of the rotating electrical machines (MG1, MG2) to the automatic transmission (20), increases due to the driver's operation of an accelerator pedal while shifting of the shift speed in the automatic transmission (20) is being performed. In the torque down control, the torque transferred to the automatic transmission (20) is reduced by limiting the output torques of the internal combustion engine (14) and the rotating electrical machines (MG1, MG2). Such torque down control can reduce the possibility that the input rotational speed of the automatic transmission (20) may increase excessively because the torque that can be transferred to the output member (22) side decreases temporarily due to the shift operation of the automatic transmission (20).

RELATED ART DOCUMENTS

Patent Documents

Patent Document 1: Japanese Unexamined Patent Application Publication No. 2020-101219 (JP 2020-101219 A)

SUMMARY OF THE DISCLOSURE

Problem to be Solved by Various Aspects of the Disclosure

However, with a vehicle drive device including an engagement device that connects and disconnects power transmission between a rotating electrical machine and an automatic transmission, it is sometimes difficult to reduce the torque transferred to the automatic transmission by such torque down control. More specifically, when the engagement device is in a directly engaged state, the torque transferred to the automatic transmission can be reduced by limiting the output torques of the rotating electrical machine and the internal combustion engine. However, when the engagement device is in a slip engaged state, the torque transferred to the automatic transmission is determined by the transfer torque of the engagement device. Therefore, the torque transferred to the automatic transmission cannot be appropriately reduced by limiting the output torques of the internal combustion engine and the rotating electrical machine.

It is therefore desired to implement a vehicle drive device that can appropriately limit the torque transferred to an automatic transmission even in the case where the required torque increases while shifting of the shift speed in the automatic transmission is being performed when an engagement device that connects and disconnects power transmission between a rotating electrical machine and the automatic transmission is in the slip engaged state.

Means for Solving the Problem

As a characteristic configuration of a vehicle drive device in view of the above, the vehicle drive device includes:
an input member drivingly connected to an internal combustion engine included in a vehicle;
an output member drivingly connected to a wheel of the vehicle;
a rotating electrical machine that functions as a driving force source for the wheel;
an automatic transmission that is configured to selectively form a plurality of shift speeds, and that changes a speed of rotation transmitted from the rotating electrical machine side at a speed ratio corresponding to the formed shift speed out of the plurality of shift speeds and transmits the resultant rotation to the output member side;
an engagement device that connects and disconnects power transmission between the rotating electrical machine and the automatic transmission; and
a control device that controls the rotating electrical machine, the automatic transmission, and the engagement device, wherein
the control device is configured to perform torque response slip control for bringing the engagement device into a slip engaged state so that transfer torque of the engagement device has a magnitude corresponding to required torque, perform shift control for shifting the shift speed of the automatic transmission, and perform transfer torque limit control for limiting the transfer torque of the engagement device to a value equal to or less than a limit value that is smaller than the required torque, the required torque being torque that is required to be transferred from the rotating electrical machine side to the automatic transmission via the engagement device, and the control device performs the transfer torque limit control instead of the torque response slip control in a case where the torque response slip control is being performed when performing the shift control.

According to this characteristic configuration, in the transfer torque limit control, the transfer torque of the engagement device is limited to a value equal to or less than the limit value that is smaller than the required torque. When the engagement device is in the slip engaged state, torque transferred to the automatic transmission is determined by the transfer torque of the engagement device. Therefore, by limiting the transfer torque of the engagement device to the limit value or less as described above, the torque transferred to the automatic transmission can be appropriately limited even when the required torque increases while the shifting of the shift speed in the automatic transmission is being performed with the engagement device being in the slip engaged state. As a result, the possibility can be reduced that the input rotational speed of the automatic transmission may increase excessively because the torque that can be transferred to the output member side decreases temporarily due to the shift operation of the automatic transmission.

DESCRIPTION OF EMBODIMENTS

Figure 1:
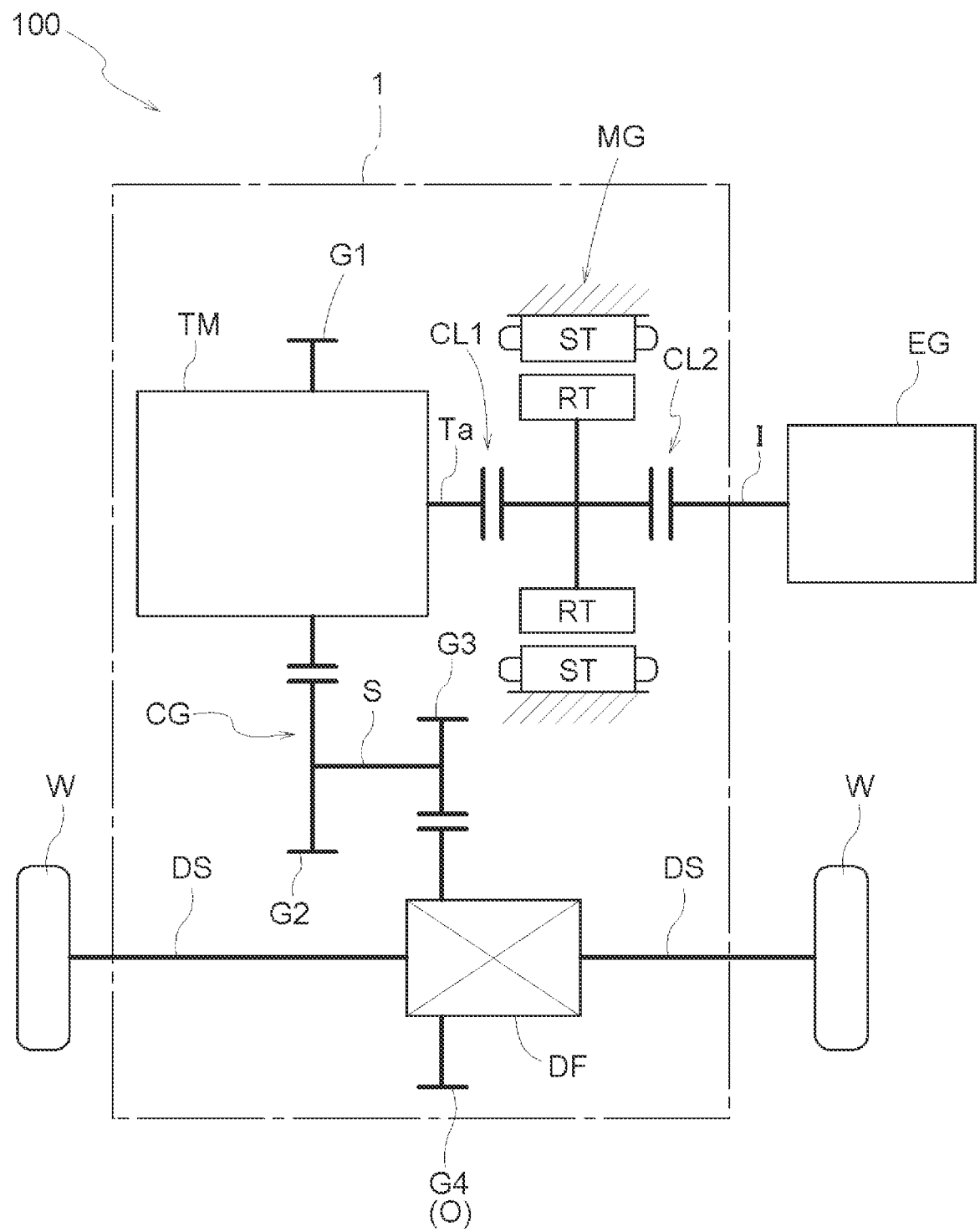
FIG. 1 is a skeleton diagram of a vehicle drive device according to an embodiment.

Hereinafter, a vehicle drive device 100 according to an embodiment will be described with reference to the drawings. As shown in FIG. 1, the vehicle drive device 100 is a device for driving a vehicle (hybrid vehicle) using one or both of an internal combustion engine EG and a rotating electrical machine MG as a driving force source for wheels W. That is, the vehicle drive device 100 is configured as a drive device for a so-called single-motor parallel hybrid vehicle.

As shown in FIG. 1, the vehicle drive device 100 includes an input member I, an output member O, the rotating electrical machine MG, an automatic transmission TM, and a first engagement device CL1. In the present embodiment, the vehicle drive device 100 further includes a second engagement device CL2, a counter gear mechanism CG, and a differential gear mechanism DF. In the present embodiment, these are housed in a case 1. Part of the input member I is exposed to the outside of the case 1.

The rotating electrical machine MG includes a stator ST fixed to a non-rotating member (case 1 in this case) and a rotor RT supported so as to be relatively rotatable with respect to the stator ST. The rotating electrical machine MG functions as a driving force source for the wheels W. The rotating electrical machine MG has a function as a motor (electric motor) that is supplied with electric power to generate power, and a function as a generator (electric power generator) that is supplied with power to generate electric power. Therefore, the rotating electrical machine MG is electrically connected to an energy storage device (battery, capacitor, etc.). The rotating electrical machine MG is supplied with electric power from the energy storage device to perform power running, or supplies electric power generated with torque of the internal combustion engine EG or inertial force of the vehicle to the energy storage device to store the electric power in the energy storage device.

Like the rotating electrical machine MG, the internal combustion engine EG functions as a driving force source for the wheels W. The internal combustion engine EG is a motor (gasoline engine, diesel engine, etc.) that is driven by combustion of fuel to output power.

The input member I is drivingly connected to the internal combustion engine EG included in the vehicle. The input member I is preferably drivingly connected to an output shaft (crankshaft etc.) of the internal combustion engine EG via a damper device (not shown) that dampens fluctuations in transferred torque.

In the present application, "drivingly connected" refers to a state in which two rotating elements are connected such that a driving force can be transmitted therebetween, and includes a state in which the two rotating elements are connected so as to rotate together or a state in which the two rotating elements are connected via one or more transmission members such that a driving force can be transmitted therebetween via the one or more transmission members. Such transmission members include various members that transmit rotation at the same speed or at a shifted speed, such as a shaft, a gear mechanism, a belt, and a chain. The transmission members may include an engagement device that selectively transmits rotation and a driving force, such as a friction engagement device and a meshing engagement device.

The first engagement device CL1 is an "engagement device" that connects and disconnects power transmission between the rotating electrical machine MG and the automatic transmission TM. In the present embodiment, the first engagement device CL1 is configured to connect and disconnect power transmission between the rotor RT of the rotating electrical machine MG and a shift input shaft Ta that is an input element of the automatic transmission TM.

The first engagement device CL1 is a friction engagement device that includes an input element as a rotating element on the side of the input member I and the rotating electrical machine MG, and an output element as a rotating element on the side of the automatic transmission TM, and whose engagement state (directly engaged state, slip engaged state, disengaged state) is controlled according to the engagement pressure between the input element and the output element. The "directly engaged state" is an engaged state with no rotational speed difference between the input element and the output element of the friction engagement device. The "slip engaged state" is an engaged state with a rotational speed difference between the input element and the output element of the friction engagement device.

The second engagement device CL2 is configured to connect and disconnect power transmission between the input member I and the rotating electrical machine MG. In the present embodiment, the second engagement device CL2 is also a friction engagement device like the first engagement device CL1.

The automatic transmission TM is configured to selectively form a plurality of shift speeds. The automatic transmission TM is a stepped automatic transmission including a plurality of shift engagement devices CLt (see FIG. 2) for forming the plurality of shift speeds. In the present embodiment, the automatic transmission TM is also shiftable to a neutral state in which none of the shift speeds is formed.

The automatic transmission TM changes the speed of rotation transmitted from the rotating electrical machine MG side at a speed ratio corresponding to the formed shift speed out of the plurality of shift speeds, and transmits the resultant rotation to the output member O side. In the present embodiment, the automatic transmission TM changes the speed of rotation input to the shift input shaft Ta and transmits the resultant rotation to a shift output gear G1 that is an output element of the automatic transmission TM.

The counter gear mechanism CG includes a counter input gear G2 and a counter output gear G3. The counter input gear G2 is an input element of the counter gear mechanism CG. The counter input gear G2 meshes with the shift output gear G1. The counter output gear G3 is an output element of the counter gear mechanism CG. The counter output gear G3 is connected to the counter input gear G2 so as to rotate with the counter input gear G2. In the present embodiment, the counter output gear G3 is connected to the counter input gear G2 via a counter shaft S that is a shaft member.

The differential gear mechanism DF includes a differential input gear G4 that meshes with the counter output gear G3 of the counter gear mechanism CG. The differential gear mechanism DF distributes rotation of the differential input gear G4 to the pair of wheels W via a pair of drive shafts DS. In the present embodiment, the differential input gear G4 corresponds to the output member O drivingly connected to the wheels W.

Figure 2:
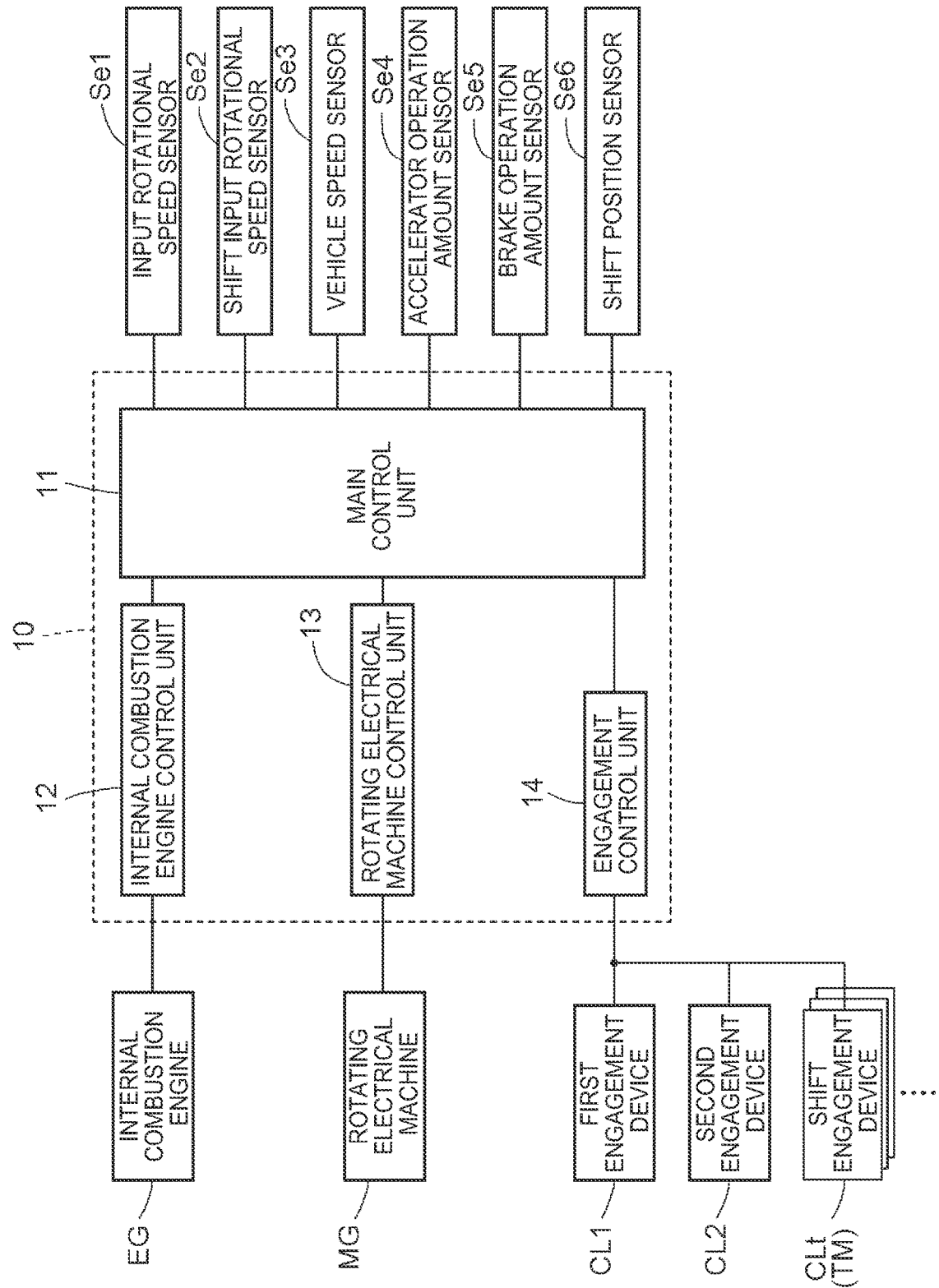
FIG. 2 is a control block diagram of the vehicle drive device according to the embodiment.

As shown in FIG. 2, the vehicle drive device 100 includes a control device 10 that controls the rotating electrical machine MG, the automatic transmission TM, and the first engagement device CL1. In the present embodiment, the control device 10 includes a main control unit 11, an internal combustion engine control unit 12 that controls the internal combustion engine EG, a rotating electrical machine control unit 13 that controls the rotating electrical machine MG, and an engagement control unit 14 that controls the engagement states of the first engagement device CL1, the second engagement device CL2, and the shift engagement devices CLt.

The main control unit 11 outputs, to each of the internal combustion engine control unit 12, the rotating electrical machine control unit 13, and the engagement control unit 14, a command to control the device(s) that is supposed to be controlled by that control unit. The internal combustion engine control unit 12 controls the internal combustion engine EG so that the internal combustion engine EG outputs target torque commanded by the main control unit 11 or so that a target rotational speed commanded by the main control unit 11 is achieved. The rotating electrical machine control unit 13 controls the rotating electrical machine MG so that the rotating electrical machine MG outputs target torque commanded by the main control unit 11 or so that a target rotational speed commanded by the main control unit 11 is achieved. The engagement control unit 14 controls actuators (not shown) for operating the first engagement device CL1, the second engagement device CL2, and the shift engagement devices CLt so that each of the first engagement device CL1, the second engagement device CL2, and the shift engagement devices CLt is brought into the engagement state commanded by the main control unit 11.

The main control unit 11 is configured to acquire information from sensors provided in each part of the vehicle equipped with the vehicle drive device 100 in order to acquire information on each part of the vehicle. In the present embodiment, the main control unit 11 is configured to acquire information from an input rotational speed sensor Se1, a shift input rotational speed sensor Se2, a vehicle speed sensor Se3, an accelerator operation amount sensor Se4, a brake operation amount sensor Se5, and a shift position sensor Se6.

The input rotational speed sensor Se1 is a sensor for detecting an input rotational speed that is the rotational speed of the input member I. The main control unit 11 calculates the input rotational speed based on a detection signal from the input rotational speed sensor Se1.

The shift input rotational speed sensor Se2 is a sensor for detecting a shift input rotational speed Nt that is the rotational speed of the shift input shaft Ta of the automatic transmission TM. The main control unit 11 calculates the shift input rotational speed Nt based on a detection signal from the shift input rotational speed sensor Se2.

The vehicle speed sensor Se3 is a sensor for detecting the traveling speed (vehicle speed) of the vehicle equipped with the vehicle drive device 100. In the present embodiment, the vehicle speed sensor Se3 is a sensor for detecting the rotational speed of the output member O. The main control unit 11 calculates the rotational speed of the output member O based on a detection signal from the vehicle speed sensor Se3. Since the rotational speed of the output member O is proportional to the vehicle speed, the main control unit 11 can calculate the vehicle speed based on the detection signal from the vehicle speed sensor Se3.

The accelerator operation amount sensor Se4 is a sensor for detecting the amount of operation of an accelerator pedal provided in the vehicle equipped with the vehicle drive device 100 by the driver (accelerator operation amount). The main control unit 11 calculates the accelerator operation amount based on a detection signal from the accelerator operation amount sensor Se4.

The brake operation amount sensor Se5 is a sensor for detecting the amount of operation of a brake pedal provided in the vehicle equipped with the vehicle drive device 100 by the driver. The main control unit 11 calculates the amount of operation of the brake pedal by the driver based on a detection signal from the brake operation amount sensor Se5.

The shift position sensor Se6 is a sensor for detecting a selected position (shift position) of a shift lever operated by the driver of the vehicle equipped with the vehicle drive device 100. The main control unit 11 calculates the shift position based on a detection signal from the shift position sensor Se6. The shift lever is configured so that a parking range (P range), a reverse travel range (R range), a neutral range (N range), a forward travel range (D range), etc. can be selected.

The control device 10 is configured to perform torque response slip control, shift control, and transfer torque limit control.

The torque response slip control is a control for bringing the first engagement device CL1 into the slip engaged state so that transfer torque T of the first engagement device CL1 has a magnitude corresponding to required torque Tr. The transfer torque T is torque that is transferred by the first engagement device CL1. The required torque Tr is torque that is required to be transferred from the side of the input member I and the rotating electrical machine MG to the automatic transmission TM via the first engagement device CL1. In the torque response slip control of the present embodiment, the engagement control unit 14 brings the first engagement device CL1 into the slip engaged state so that the transfer torque T of the first engagement device CL1 has a magnitude corresponding to the required torque Tr commanded by the main control unit 11. The transfer torque T of the first engagement device CL1 in the slip engaged state is determined according to the engagement pressure between the input element and the output element of the friction engagement device serving as the first engagement device CL1. Therefore, the engagement control unit 14 controls the engagement pressure of the first engagement device CL1 according to the required torque Tr.

The shift control is a control for shifting the shift speed of the automatic transmission TM. In the shift control of the present embodiment, the engagement control unit 14 controls the engagement states of the plurality of shift engagement devices CLt so that the automatic transmission TM is brought into the state commanded by the main control unit 11. That is, the engagement control unit 14 controls the engagement states of the plurality of shift engagement devices CLt so that the shift speed commanded by the main control unit 11 is formed in the automatic transmission TM. In some cases, the engagement control unit 14 controls the engagement states of the plurality of shift engagement devices CLt so that the automatic transmission TM goes into the neutral state.

The transfer torque limit control is a control for limiting the transfer torque T of the first engagement device CL1 to a value equal to or less than a limit value LM that is smaller than the required torque Tr. The control device 10 performs the transfer torque limit control instead of the torque response slip control in the case where the torque response slip control is being performed when performing the shift control.

As described above, the vehicle drive device 100 includes:
  the input member I drivingly connected to the internal combustion engine EG included in the vehicle;
  the output member O drivingly connected to the wheels W of the vehicle;
  the rotating electrical machine MG that functions as a driving force source for the wheels W;
  the automatic transmission TM that is configured to selectively form the plurality of shift speeds, and that changes the speed of rotation transmitted from the rotating electrical machine MG side at the speed ratio corresponding to the formed shift speed out of the plurality of shift speeds and transmits the resultant rotation to the output member O side;
  the first engagement device CL1 that connects and disconnects power transmission between the rotating electrical machine MG and the automatic transmission TM; and
  the control device 10 that controls the rotating electrical machine MG, the automatic transmission TM, and the first engagement device CL1.

The control device 10 is configured to perform the torque response slip control for bringing the first engagement device CL1 into the slip engaged state so that the transfer torque T of the first engagement device CL1 has a magnitude corresponding to the required torque Tr, perform the shift control for shifting the shift speed of the automatic transmission TM, and perform the transfer torque limit control for limiting the transfer torque T of the first engagement device CL1 to a value equal to or less than the limit value LM that is smaller than the required torque Tr, the required torque Tr being torque that is required to be transferred from the rotating electrical machine MG side to the automatic transmission TM via the first engagement device CL1.

The control device 10 performs the transfer torque limit control instead of the torque response slip control in the case where the torque response slip control is being performed when performing the shift control.

According to this configuration, in the transfer torque limit control, the transfer torque T of the first engagement device CL1 is limited to a value equal to or less than the limit value LM that is smaller than the required torque Tr. When the first engagement device CL1 is in the slip engaged state, the torque transferred to the automatic transmission TM is determined by the transfer torque T of the first engagement device CL1. Therefore, by limiting the transfer torque T of the first engagement device CL1 to the limit value LM or less as described above, the torque transferred to the automatic transmission TM can be appropriately limited even when the required torque Tr increases while the shifting of the shift speed in the automatic transmission TM is being performed with the first engagement device CL1 being in the slip engaged state. As a result, the possibility can be reduced that the shift input rotational speed Nt that is the input rotational speed of the automatic transmission TM may increase excessively because the torque that can be transferred to the output member O side decreases temporarily due to the shift operation of the automatic transmission TM.

In the present embodiment, the limit value LM is a value according to torque that is transferable to the automatic transmission TM during the shift control. The "torque that is transferable to the automatic transmission TM during the shift control" refers to the maximum torque that can be transferred by the shift engagement device CLt in the slip engaged state during the shift operation of the automatic transmission TM, that is, the transfer torque capacity. For example, the limit value LM can be set based on the transfer torque capacity of the shift engagement device CLt in the slip engaged state during the shift control multiplied by the speed ratio in the power transmission path between this shift engagement device CLt and the shift input shaft Ta.

According to this configuration, in the transfer torque limit control, the transfer torque T of the first engagement device CL1 is limited to a value equal to or less than the limit value LM according to the torque that is transferable to the automatic transmission TM during the shift control. The possibility can thus be appropriately reduced that the shift input rotational speed Nt that is the input rotational speed of the automatic transmission TM may increase excessively because the torque that can be transferred to the output member O side decreases temporarily due to the shift operation of the automatic transmission TM.

In the present embodiment, in the transfer torque limit control, the control device 10 gradually increases the limit value LM according to the timing when the shifting of the shift speed of the automatic transmission TM by the shift control is completed. In this example, in the transfer torque limit control, the control device 10 gradually increases the limit value LM at the same time as the shifting of the shift speed of the automatic transmission TM by the shift control is completed.

According to this configuration, the torque transferred to the output member O side is less likely to increase sharply after the transfer torque limit control ends. This can reduce fluctuations in wheel driving force that occur after the transfer torque limit control ends.

In the present embodiment, during the torque response slip control, the control device 10 controls the combined output torque of the internal combustion engine EG and the rotating electrical machine MG so that the combined output torque approaches the required torque Tr. In this example, during the torque response slip control, the internal combustion engine control unit 12 controls the internal combustion engine EG and the rotating electrical machine control unit 13 controls the rotating electrical machine MG so that the combined output torque of the internal combustion engine EG and the rotating electrical machine MG approaches the required torque Tr.

According to this configuration, it is easy to keep the differential rotation in the first engagement device CL1 in the slip engaged state within a certain range during the torque response slip control. Therefore, the differential rotation in the first engagement device CL1 can be avoided from becoming excessively large, or the differential rotation in the first engagement device CL1 can be avoided from decreasing enough to bring the first engagement device CL1 into the directly engaged state. That is, the slip engaged state of the first engagement device CL1 can be appropriately maintained.

In the present embodiment, the shift control includes a downshift in which the shift speed is shifted from a second shift speed with a relatively low speed ratio to a first shift speed with a relatively high speed ratio, and a garage shift in which the automatic transmission TM is shifted from the neutral state to a state in which any one of the plurality of shift speeds is formed. When performing the downshift or the garage shift, the control device 10 performs the transfer torque limit control when a prescribed condition is satisfied. The garage shift is usually performed by the selection of the range of the automatic transmission TM by the driver of the vehicle being switched from the "parking range (P range)" or the "neutral range (N range)" to the "forward travel range (D range)" or the "reverse travel range (R range)." In the present embodiment, in addition to this, the garage shift also includes, for example, the case where any one of the plurality of shift speeds is formed from the neutral state of the automatic transmission TM by the control of the control device 10 according to the traveling state etc. of the vehicle rather than by the driver's operation.

A control process that is performed by the control device 10 to perform the downshift will be described below with reference to FIGS. 3 and 4.

Figure 3:
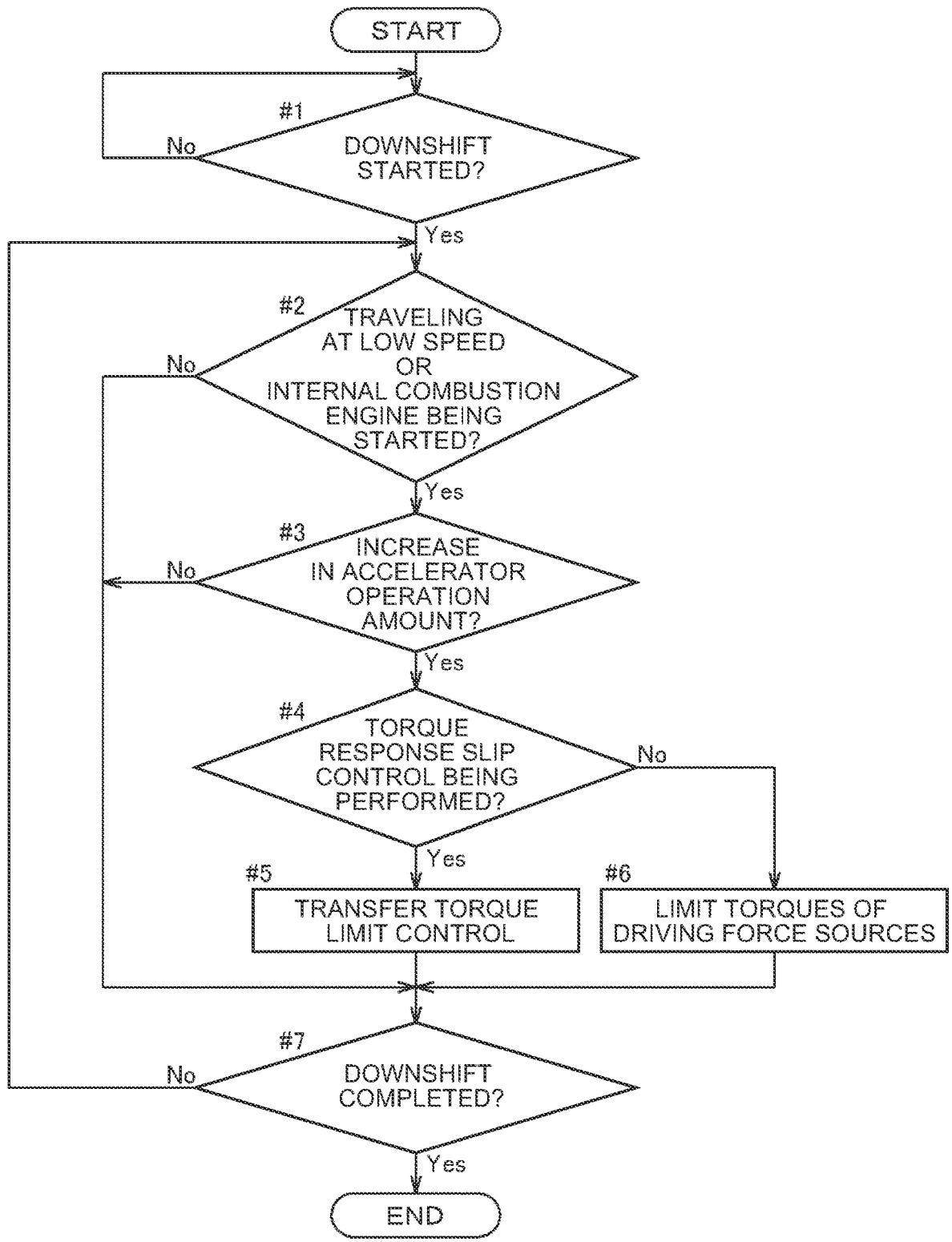
FIG. 3 is a flowchart showing an example of a control process that is performed by a control device to perform a downshift.

FIG. 3 is a flowchart showing an example of the control process that is performed by the control device 10 to perform the downshift.

As shown in FIG. 3, the control device 10 first starts this control process when downshift control is started (step #1: Yes). In the present embodiment, the engagement control unit 14 starts to control the plurality of shift engagement devices CLt so that the shift speed is shifted from the second shift speed to the first shift speed.

Next, the control device 10 determines whether the vehicle is traveling with the internal combustion engine EG running and with the input rotational speed, namely the rotational speed of the input member I, being less than an idle rotational speed of the internal combustion engine EG, or the vehicle is traveling and the internal combustion engine EG is being started (step #2). In the present embodiment, the main control unit 11 makes the above determination based on the input rotational speed calculated based on the detection signal from the input rotational speed sensor Se1, the vehicle speed calculated based on the detection signal from the vehicle speed sensor Se3, etc.

When the control device 10 determines that the vehicle is in neither of the state in which the vehicle is traveling with the internal combustion engine EG running and with the input rotational speed being less than the idle rotational speed of the internal combustion engine EG, and the state in which the vehicle is traveling and the internal combustion engine EG is being started (step #2: No), the control device 10 performs the downshift so that the first shift speed is formed in the automatic transmission TM without performing the transfer torque limit control. The control device 10 ends the control when the downshift is completed (step #7: Yes).

On the other hand, when the control device 10 determines that the vehicle is in either the state in which the vehicle is traveling with the internal combustion engine EG running and with the input rotational speed being less than the idle rotational speed of the internal combustion engine EG, or the state in which the vehicle is traveling and the internal combustion engine EG is being started (step #2: Yes), the control device 10 determines whether an increase in accelerator operation amount has been detected (step #3). In the present embodiment, the main control unit 11 makes the above determination based on the accelerator operation amount calculated based on the detection signal from the accelerator operation amount sensor Se4.

When an increase in accelerator operation amount has not been detected (step #3: No), the control device 10 performs the downshift without performing the transfer torque limit control. The control device 10 ends the control when the downshift is completed (step #7: Yes).

On the other hand, when an increase in accelerator operation amount has been detected (step #3: Yes), the control device 10 determines whether the torque response slip control is being performed (step #4). In the present embodiment, the main control unit 11 makes the above determination by determining via the engagement control unit 14 whether the first engagement device CL1 is in the slip engaged state.

When the control device 10 determines that the torque response slip control is being performed (step #4: Yes), the control device 10 performs the transfer torque limit control (step #5). In the present embodiment, the engagement control unit 14 controls the engagement pressure of the first engagement device CL1 so that the transfer torque T of the first engagement device CL1 is limited to the limit value LM or less. When the downshift is performed as in this example, the limit value LM is set so that the shift input rotational speed Nt will not become higher than a synchronous rotational speed in the first shift speed after shifting even when the accelerator operation amount increases sharply during the transfer torque limit control.

When the control device 10 determines that the torque response slip control is not being performed (step #4: No), that is, when the control device 10 determines that the first engagement device CL1 is in the directly engaged state, the control device 10 limits the output torques of the internal combustion engine EG and the rotating electrical machine MG both serving as driving force sources for the wheels W. In the present embodiment, the internal combustion engine control unit 12 controls the internal combustion engine EG and the rotating electrical machine control unit 13 controls the rotating electrical machine MG so that the combined output torque of the internal combustion engine EG and the rotating electrical machine MG is limited to the limit value LM or less. As described above, when the shift control is performed with the first engagement device CL1 in the directly engaged state, the output torques of the internal combustion engine EG and the rotating electrical machine MG that are controlled according to the required torque Tr are limited to the limit value LM or less. The torque that is transferred to the automatic transmission TM can thus be appropriately limited even when the required torque Tr increases during shifting of the shift speed in the automatic transmission TM. As a result, the possibility can be reduced that the shift input rotational speed Nt that is the input rotational speed of the automatic transmission TM may increase excessively because the torque that can be transferred to the output member O side decreases temporarily due to the shift operation of the automatic transmission TM.

The control device 10 performs the control of steps #2 to #6 until the downshift is completed (step #7: No). The control ends when the downshift is completed (step #7: Yes).

Figure 4:
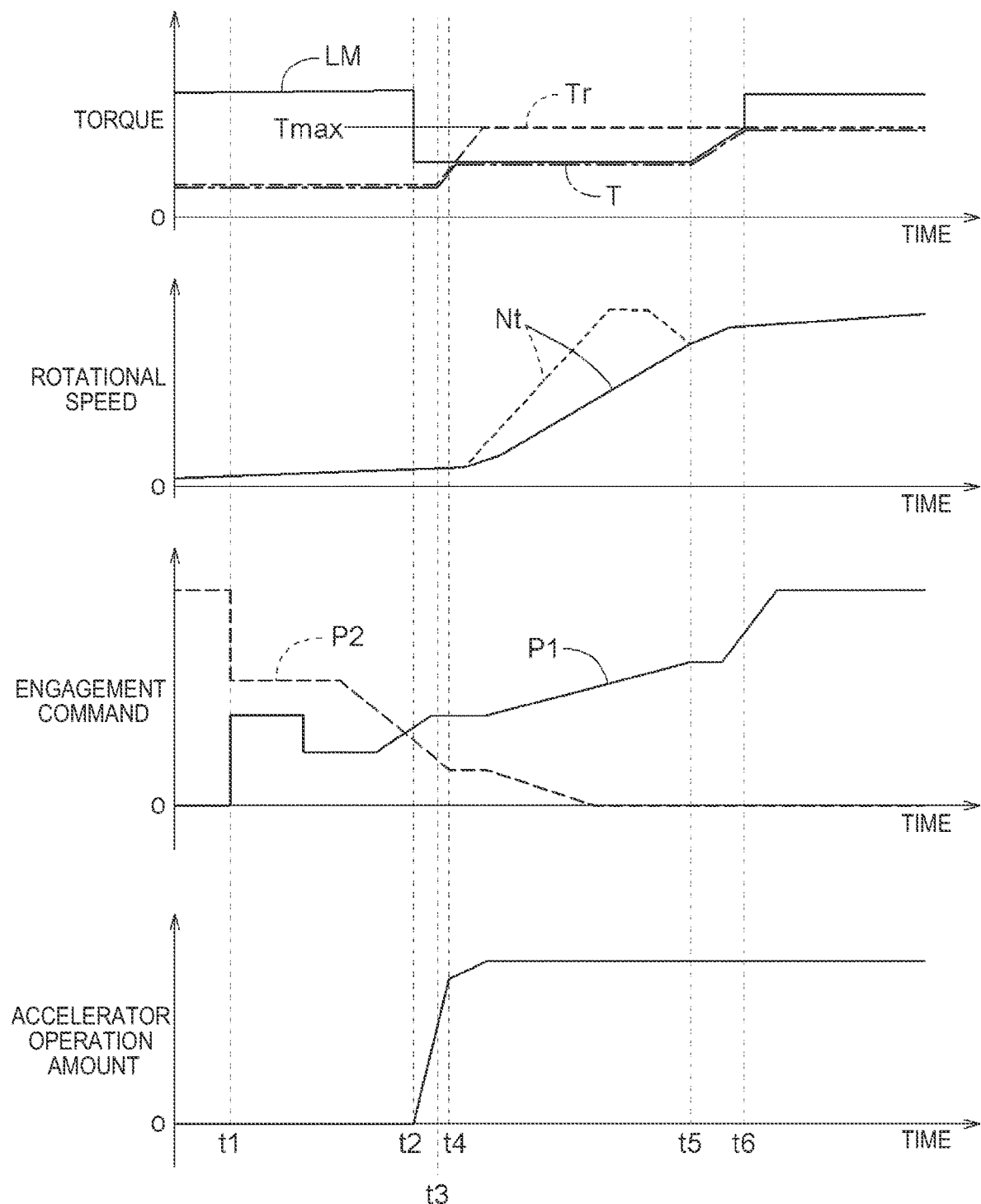
FIG. 4 is a timing chart showing an example of the control process that is performed by the control device to perform a downshift.

FIG. 4 is a timing chart showing an example of a control process that is performed by the control device 10 in the case where the downshift is performed while the torque response slip control is being performed either when the vehicle is caused to travel with the internal combustion engine EG running and with the input rotational speed being less than the idle rotational speed of the internal combustion engine EG or when the internal combustion engine EG is started while the vehicle is traveling.

As shown in FIG. 4, at time t1, the main control unit 11 sends a downshift command to the engagement control unit 14. At this time, a first engagement pressure command P1 increases. The first engagement pressure command P1 is a target engagement pressure (engagement pressure command) for the shift engagement device CLt that is to be switched from the disengaged state to the engaged state when the shift speed is shifted from the second shift speed to the first shift speed, out of the plurality of shift engagement devices CLt. On the other hand, a second engagement pressure command P2 decreases. The second engagement pressure command P2 is a target engagement pressure (engagement pressure command) for the shift engagement device CLt that is to be switched from the engaged state to the disengaged state when the shift speed is shifted from the second shift speed to the first shift speed, out of the plurality of shift engagement devices CLt.

When the accelerator operation amount starts to increase at time t2, the control device 10 performs the transfer torque limit control to reduce the limit value LM.

At time t3, the main control unit 11 increases the required torque Tr with the increase in accelerator operation amount. At this time, the engagement control unit 14 increases the transfer torque T of the first engagement device CL1 with the increase in required torque Tr commanded by the main control unit 11.

At time t4, the required torque Tr and the transfer torque T reach the limit value LM. In this example, after time t4, the main control unit 11 increases the required torque Tr to Tmax according to the accelerator operation amount. On the other hand, the engagement control unit 14 limits the transfer torque T of the first engagement device CL1 so that the transfer torque T will not become larger than the limit value LM. As a result, the transfer torque T of the first engagement device CL1 is kept at the limit value LM. Accordingly, even when the accelerator operation amount increases, the shift input rotational speed Nt is less likely to increase excessively and become higher than the synchronous rotational speed in the first shift speed (see the shift input rotational speed Nt shown by dashed line in FIG. 4), and the shift input rotational speed Nt can be gradually increased (see the shift input rotational speed Nt shown by continuous line in FIG. 4).

At time t5, the first engagement pressure command P1 reaches a value required to form the first shift speed, and the shift engagement device CLt that forms the first shift speed is brought into the directly engaged state. The downshift is thus completed. When the control device 10 determines that the downshift is completed, the control device 10 gradually increases the limit value LM. In this example, the control device 10 increases the limit value LM at a constant rate over time. When the limit value LM and the transfer torque T of the first engagement device CL1 reach the required torque Tr at time t6, the control device 10 ends the transfer torque limit control and sets the limit value LM back to its original value.

As described above, in the present embodiment, the plurality of shift speeds includes the first shift speed and the second shift speed having a lower speed ratio than the first shift speed.

The control device 10 starts the transfer torque limit control in response to an increase in accelerator operation amount of the vehicle, when performing shifting from the second shift speed to the first shift speed by the shift control during the torque response slip control being performed because the vehicle is traveling with the internal combustion engine EG running and with the input rotational speed, namely the rotational speed of the input member I, being less than the idle rotational speed of the internal combustion engine EG, or because the internal combustion engine EG is started while the vehicle is traveling.

It is preferable that the torque response slip control be performed when the vehicle is caused to travel with the internal combustion engine EG running and with the input rotational speed being less than the idle rotational speed of the internal combustion engine EG or when the internal combustion engine EG is started while the vehicle is traveling. When performing the shifting from the second shift speed to the first shift speed by the shift control during the torque response slip control being performed due to the above reasons, an increase in accelerator operation amount during the shift control creates a situation where the shift input rotational speed Nt that is the input rotational speed of the automatic transmission TM tends to increase excessively. Therefore, starting the transfer torque limit control in response to an increase in accelerator operation amount of the vehicle can appropriately reduce the possibility that the shift input rotational speed Nt may increase excessively even when the required torque Tr increases.

Next, a control process that is performed by the control device 10 to perform the garage shift will be described below with reference to FIGS. 5 and 6.

Figure 5:
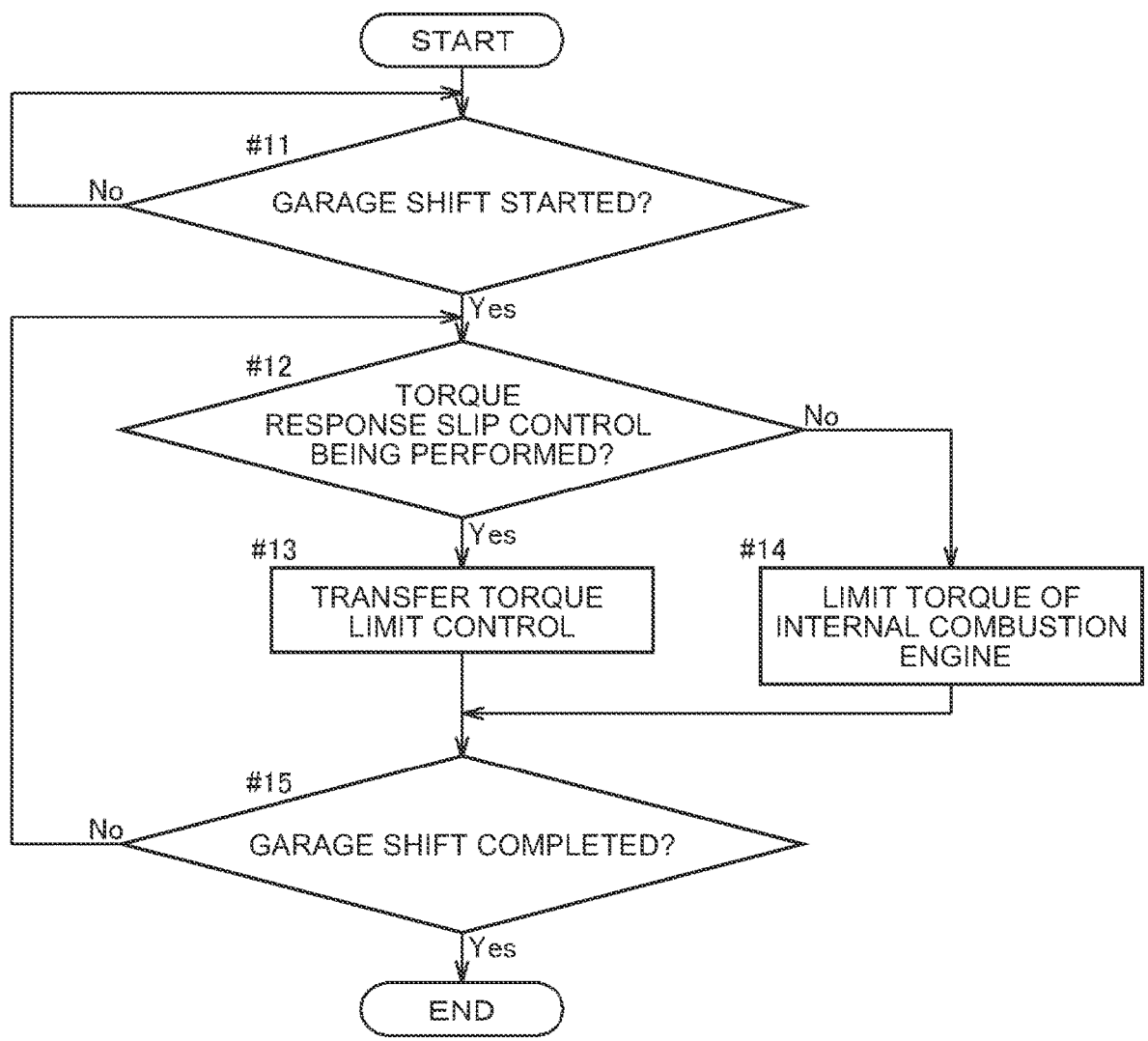
FIG. 5 is a flowchart showing an example of a control process that is performed by the control device to perform a garage shift.

FIG. 5 is a flowchart showing an example of the control process that is performed by the control device 10 to perform the garage shift.

As shown in FIG. 5, the control device 10 first starts this control process when garage shift control is started (step #11: Yes). In the present embodiment, when the main control unit 11 detects based on the detection signal from the shift position sensor Se6 that the shift lever has been operated from the parking range (P range) or the neutral range (N range) to the forward travel range (D range) or the reverse travel range (R range), the engagement control unit 14 starts to control the plurality of shift engagement devices CLt so as to shift the automatic transmission TM from the neutral state to the state in which a shift speed is formed.

Next, the control device 10 determines whether the torque response slip control is being performed (step #12).

When the control device 10 determines that the torque response slip control is being performed (step #12: Yes), the control device 10 performs the transfer torque limit control (step #13). In the present embodiment, the engagement control unit 14 controls the engagement pressure of the first engagement device CL1 so that the transfer torque T of the first engagement device CL1 is limited to the limit value LM or less. When the garage shift is performed as in this example, the limit value LM is set so that the amount of heat generated by the first engagement device CL1 due to an increase in shift input rotational speed Nt is less than a predetermined threshold and so that it is ensured that the vehicle has at least a predetermined level of travel performance.

When the control device 10 determines that the torque response slip control is not being performed (step #12: No), that is, when the control device 10 determines that the first engagement device CL1 is in the directly engaged state, the control device 10 limits the output torques of the internal combustion engine EG and the rotating electrical machine MG both serving as driving force sources for the wheels W. In the present embodiment, the internal combustion engine control unit 12 controls the internal combustion engine EG and the rotating electrical machine control unit 13 controls the rotating electrical machine MG so that the combined output torque of the internal combustion engine EG and the rotating electrical machine MG is limited to the limit value LM or less.

The control device 10 performs the control of steps #12 to #14 until the garage shift is completed (step #15: No). The control ends when the garage shift is completed (step #15: Yes).

Figure 6:
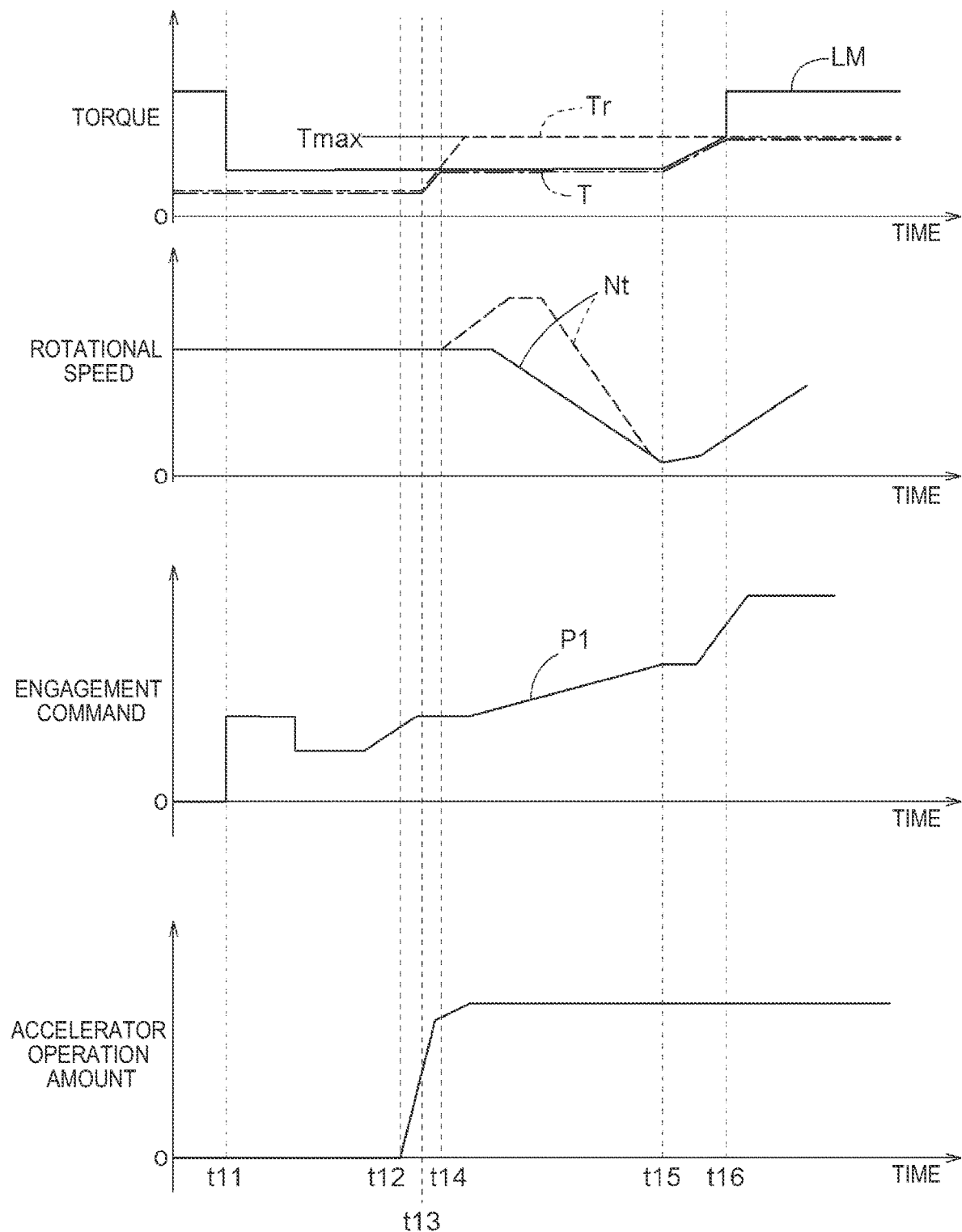
FIG. 6 is a timing chart showing an example of the control process that performed by the control device to perform a garage shift.

FIG. 6 is a timing chart showing an example of the control process that is performed by the control device 10 to perform the garage shift while the torque response slip control is being performed.

As shown in FIG. 6, at time t11, the main control unit 11 sends a command to form a shift speed to the engagement control unit 14 in response to an operation of the shift lever from the parking range (P range) or the neutral range (N range) to the forward travel range (D range) or the reverse travel range (R range). At this time, the first engagement pressure command P1 increases. The first engagement pressure command P1 is a target engagement pressure (engagement pressure command) for the shift engagement device CLt that is to be switched from the disengaged state to the engaged state when the shift speed is formed, out of the plurality of shift engagement devices CLt.

In addition, at time t11, the control device 10 performs the transfer torque limit control in response to the start of such a garage shift as described above to reduce limit value LM.

When the accelerator operation amount starts to increase at time t12, the main control unit 11 increases the required torque Tr at time t13 with the increase in accelerator operation amount. At this time, the engagement control unit 14 increases the transfer torque T of the first engagement device CL1 with the increase in required torque Tr commanded by the main control unit 11.

At time t14, the required torque Tr and the transfer torque T reach the limit value LM. In this example, after time t14, the main control unit 11 increases the required torque Tr to Tmax according to the accelerator operation amount. On the other hand, the engagement control unit 14 limits the transfer torque T of the first engagement device CL1 so that the transfer torque T will not become larger than the limit value LM. As a result, the transfer torque T of the first engagement device CL1 is kept at the limit value LM. Accordingly, even when the accelerator operation amount increases, the shift input rotational speed Nt is less likely to increase excessively (see the shift input rotational speed Nt shown by dashed line in FIG. 6), and the shift input rotational speed Nt can be gradually reduced (see the shift input rotational speed Nt shown by continuous line in FIG. 6).

At time t15, the first engagement pressure command P1 reaches a value required to form the shift speed, and the shift engagement device CLt that forms the shift speed is brought into the directly engaged state. The garage shift is thus completed. When the control device 10 determines that the garage shift is completed, the control device 10 gradually increases the limit value LM. In this example, the control device 10 increases the limit value LM at a constant rate over time. When the limit value LM and the transfer torque T of the first engagement device CL1 reach the required torque Tr at time t16, the control device 10 ends the transfer torque limit control and sets the limit value LM back to its original value.

As described above, the automatic transmission TM is also shiftable to the neutral state in which none of the shift speeds is formed.

When the shift control for shifting the automatic transmission TM from the neutral state to the state in which any one of the plurality of shift speeds is formed is started during the torque response slip control, the control device 10 starts the transfer torque limit control in response to the start of the shift control.

When the shift control for shifting the automatic transmission TM from the neutral state to the state in which any one of the plurality of shift speeds is formed, it is highly likely that the accelerator operation amount is increased subsequently and the vehicle starts to accelerate accordingly. When such shift control and such an increase in accelerator operation amount occur during the torque response slip control, it creates a situation where the shift input rotational speed Nt that is the input rotational speed of the automatic transmission TM tends to increase excessively. According to this configuration, in such a case, the transfer torque limit control is started, without waiting for the accelerator operation amount to increase, in response to the start of the shift control for shifting the automatic transmission TM from the neutral state to the state in which any one of the plurality of shift speeds is formed. This can appropriately reduce the possibility that the shift input rotational speed Nt may increase excessively even when the accelerator operation amount increases subsequently and the required torque Tr increases accordingly.

Other Embodiments (1) The above embodiment illustrates, as an example, the configuration in which, in the transfer torque limit control, the control device 10 gradually increases the limit value LM at the same time as the shifting of the shift speed of the automatic transmission TM by the shift control is completed. However, the present disclosure is not limited to such a configuration. For example, in the transfer torque limit control, the control device 10 may gradually increase the limit value LM a predetermined time after the shifting of the shift speed of the automatic transmission TM by the shift control is completed. Alternatively, in the transfer torque limit control, the control device 10 may increase the limit value LM stepwise to the required torque Tr after the shifting of the shift speed of the automatic transmission TM by the shift control is completed.

(2) The above embodiment illustrates, as an example, the configuration in which the transfer torque limit control ends when the limit value LM reaches the required torque Tr. However, the present disclosure is not limited to such a configuration. For example, the transfer torque limit control may end when the limit value LM reaches a predetermined value less than the required torque Tr. In this case, the predetermined value can be set to, for example, a value smaller than the required torque Tr by a preset value.

(3) The above embodiment illustrates, as an example, the configuration including the second engagement device CL2 that connects and disconnects power transmission between the input member I and the rotating electrical machine MG. However, the present disclosure is not limited to such a configuration. The present disclosure may be a configuration that does not include the second engagement device CL2.

(4) The configuration disclosed in each of the above embodiments can be applied in combination with the configurations disclosed in the other embodiments as long as no contradiction arises. Regarding the other configurations as well, the embodiments disclosed herein are merely illustrative in all respects. Therefore, various modifications can be made as appropriate without departing from the spirit of the present disclosure.

Overview of Embodiment Described Above

Hereinafter, an overview of the vehicle drive device (100) described above will be provided.

The vehicle drive device (100) includes: an input member (I) drivingly connected to an internal combustion engine (EG) included in a vehicle;
an output member (O) drivingly connected to a wheel (W) of the vehicle;
a rotating electrical machine (MG) that functions as a driving force source for the wheel (W);
an automatic transmission (TM) that is configured to selectively form a plurality of shift speeds, and that changes a speed of rotation transmitted from the rotating electrical machine (MG) side at a speed ratio corresponding to the formed shift speed out of the plurality of shift speeds and transmits the resultant rotation to the output member (O) side;
an engagement device (CL1) that connects and disconnects power transmission between the rotating electrical machine (MG) and the automatic transmission (TM); and
a control device (10) that controls the rotating electrical machine (MG), the automatic transmission (TM), and the engagement device (CL1).

The control device (10) is configured to perform torque response slip control for bringing the engagement device (CL1) into a slip engaged state so that transfer torque (T) of the engagement device (CL1) has a magnitude corresponding to required torque (Tr), perform shift control for shifting the shift speed of the automatic transmission (TM), and perform transfer torque limit control for limiting the transfer torque (T) of the engagement device (CL1) to a value equal to or less than a limit value (LM) that is smaller than the required torque (Tr), the required torque (Tr) being torque that is required to be transferred from the rotating electrical machine (MG) side to the automatic transmission (TM) via the engagement device (CL1).

The control device (10) performs the transfer torque limit control instead of the torque response slip control in a case where the torque response slip control is being performed when performing the shift control.

According to this configuration, in the transfer torque limit control, the transfer torque (T) of the engagement device (CL1) is limited to a value equal to or less than the limit value (LM) that is smaller than the required torque (Tr). When the engagement device (CL1) is in the slip engaged state, torque transferred to the automatic transmission (TM) is determined by the transfer torque (T) of the engagement device (CL1). Therefore, by limiting the transfer torque (T) of the engagement device (CL1) to the limit value (LM) or less as described above, the torque transferred to the automatic transmission (TM) can be appropriately limited even when the required torque (Tr) increases while the shifting of the shift speed in the automatic transmission (TM) is being performed with the engagement device (CL1) being in the slip engaged state. As a result, the possibility can be reduced that a shift input rotational speed (Nt) that is an input rotational speed of the automatic transmission (TM) may increase excessively because the torque that can be transferred to the output member (O) side decreases temporarily due to the shift operation of the automatic transmission (TM).

The limit value (LM) is a value according to torque that is transferable to the automatic transmission (TM) during the shift control.

According to this configuration, in the transfer torque limit control, the transfer torque T of the engagement device (CL1) is limited to a value equal to or less than the limit value (LM) according to the torque that is transferable to the automatic transmission (TM) during the shift control. Accordingly, the possibility can be appropriately reduced that a shift input rotational speed (Nt) that is an input rotational speed of the automatic transmission (TM) may increase excessively because the torque that can be transferred to the output member (O) side decreases temporarily due to the shift operation of the automatic transmission (TM).

In the transfer torque limit control, the control device (10) gradually increases the limit value (LM) according to a timing when shifting of the shift speed of the automatic transmission (TM) by the shift control is completed.

According to this configuration, the torque transferred to the output member (O) side is less likely to increase sharply after the transfer torque limit control ends. This can reduce fluctuations in wheel driving force that occur after the transfer torque limit control ends.

During the torque response slip control, the control device (10) controls combined output torque of the internal combustion engine (EG) and the rotating electrical machine (MG) in such a manner that the combined output torque approaches the required torque (Tr).

According to this configuration, it is easy to keep differential rotation in the engagement device (CL1) in the slip engaged state within a certain range during the torque response slip control. Therefore, the differential rotation in the engagement device (CL1) can be avoided from becoming excessively large, or the differential rotation in the engagement device (CL1) can be avoided from decreasing enough to bring the engagement device (CL1) into a directly engaged state. That is, the slip engaged state of the engagement device (CL1) can be appropriately maintained.

The plurality of shift speeds includes a first shift speed and a second shift speed having a lower speed ratio than the first shift speed.

The control device (10) starts the transfer torque limit control in response to an increase in accelerator operation amount of the vehicle, when performing shifting from the second shift speed to the first shift speed by the shift control during the torque response slip control being performed because the vehicle is traveling with the internal combustion engine (EG) running and with a rotational speed of the input member (I) being less than an idle rotational speed of the internal combustion engine (EG), or because the internal combustion engine (EG) is started while the vehicle is traveling.

It is preferable that the torque response slip control be performed when the vehicle is caused to travel with the internal combustion engine (EG) running and with the rotational speed of the input member (I) being less than the idle rotational speed of the internal combustion engine (EG) or when the internal combustion engine EG is started while the vehicle is traveling. When performing the shifting from the second shift speed to the first shift speed by the shift control during the torque response slip control being performed due to the above reasons, an increase in accelerator operation amount during the shift control creates a situation where the shift input rotational speed (Nt) that is the input rotational speed of the automatic transmission (TM) tends to increase excessively. Therefore, starting the transfer torque limit control in response to an increase in accelerator operation amount of the vehicle can appropriately reduce the possibility that the shift input rotational speed (Nt) may increase excessively even when the required torque (Tr) increases.

The automatic transmission (TM) is also shiftable to a neutral state in which none of the shift speeds is formed.

When the shift control for shifting the automatic transmission (TM) from the neutral state to a state in which any one of the plurality of shift speeds is formed is started during the torque response slip control, the control device (10) starts the transfer torque limit control in response to a start of the shift control.

When the shift control for shifting the automatic transmission (TM) from the neutral state to the state in which any one of the plurality of shift speeds is formed, it is highly likely that the accelerator operation amount is increased subsequently and the vehicle starts to accelerate accordingly. When such shift control and such an increase in accelerator operation amount occur during the torque response slip control, it creates a situation where the shift input rotational speed (Nt) that is the input rotational speed of the automatic transmission (TM) tends to increase excessively. According to this configuration, in such a case, the transfer torque limit control is started, without waiting for the accelerator operation amount to increase, in response to the start of the shift control for shifting the automatic transmission (TM) from the neutral state to the state in which any one of the plurality of shift speeds is formed. This can appropriately reduce the possibility that the shift input rotational speed (Nt) may increase excessively even when the accelerator operation amount increases subsequently and the required torque (Tr) increases accordingly.

INDUSTRIAL APPLICABILITY

The technology according to the present disclosure is applicable to a vehicle drive device including: an input member drivingly connected to an internal combustion engine included in a vehicle; an output member drivingly connected to a wheel of the vehicle; a rotating electrical machine that functions as a driving force source for the wheel; an automatic transmission that changes the speed of rotation transmitted from the rotating electrical machine side and transmits the resultant rotation to the output member side; an engagement device that connects and disconnects power transmission between the rotating electrical machine and the automatic transmission; and a control device that control these.

DESCRIPTION OF THE REFERENCE NUMERALS

100: vehicle drive device, 10: control device, I: input member, O: output member, MG: rotating electrical machine, TM: automatic transmission, CL1: first engagement device (engagement device), EG: internal combustion engine, W: wheel

The invention claimed is:

1. A vehicle drive device comprising:
   an input member drivingly connected to an internal combustion engine included in a vehicle;
   an output member drivingly connected to a wheel of the vehicle;
   a rotating electrical machine that functions as a driving force source for the wheel;
   an automatic transmission that is configured to selectively form a plurality of shift speeds, and that changes a speed of rotation transmitted from the rotating electrical machine side at a speed ratio corresponding to the formed shift speed out of the plurality of shift speeds and transmits the resultant rotation to the output member side;
   an engagement device that connects and disconnects power transmission between the rotating electrical machine and the automatic transmission; and
   a control device that controls the rotating electrical machine, the automatic transmission, and the engagement device, wherein the control device is configured to perform torque response slip control for bringing the engagement device into a slip engaged state so that transfer torque of the engagement device has a magnitude corresponding to required torque, perform shift control for shifting the shift speed of the automatic transmission, and perform transfer torque limit control for limiting the transfer torque of the engagement device to a value equal to or less than a limit value that is smaller than the required torque, the required torque being torque that is required to be transferred from the rotating electrical machine side to the automatic transmission via the engagement device, and
   the control device performs the transfer torque limit control instead of the torque response slip control in a case where the torque response slip control is being performed when performing the shift control.

2. The vehicle drive device according to claim 1, wherein the limit value is a value according to torque that is transferable to the automatic transmission during the shift control.

3. The vehicle drive device according to claim 1, wherein in the transfer torque limit control, the control device gradually increases the limit value according to a timing when shifting of the shift speed of the automatic transmission by the shift control is completed.

4. The vehicle drive device according to claim 1, wherein during the torque response slip control, the control device controls combined output torque of the internal combustion engine and the rotating electrical machine in such a manner that the combined output torque approaches the required torque.

5. The vehicle drive device according to claim 1, wherein
the plurality of shift speeds includes a first shift speed and a second shift speed having a lower speed ratio than the first shift speed, and
the control device starts the transfer torque limit control in response to an increase in accelerator operation amount of the vehicle, when performing shifting from the second shift speed to the first shift speed by the shift control during the torque response slip control performed because the vehicle is traveling with the internal combustion engine running and with a rotational speed of the input member being less than an idle rotational speed of the internal combustion engine, or because the internal combustion engine is started while the vehicle is traveling.

6. The vehicle drive device according to claim 1, wherein
the automatic transmission is also shiftable to a neutral state in which none of the shift speeds is formed, and
when the shift control for shifting the automatic transmission from the neutral state to a state in which any one of the plurality of shift speeds is formed is started during the torque response slip control, the control device starts the transfer torque limit control in response to a start of the shift control.

* * * * *